United States Patent [19]
Tomita et al.

[11] Patent Number: 5,194,943
[45] Date of Patent: Mar. 16, 1993

[54] VIDEO CAMERA HAVING A γ-CORRECTION CIRCUIT FOR CORRECTING LEVEL CHARACTERISTICS OF A LUMINANCE SIGNAL INCLUDED IN A VIDEO SIGNAL

[75] Inventors: Tsutomu Tomita, Katsuta; Hiroyasu Otsubo, Chigasaki, both of Japan

[73] Assignee: Hitachi, Ltd., Tokyo, Japan

[21] Appl. No.: 788,236

[22] Filed: Nov. 5, 1991

[30] Foreign Application Priority Data

Nov. 6, 1990 [JP] Japan .................................. 2-298808

[51] Int. Cl.⁵ ...................... H04N 9/69; H04N 9/73 C
[52] U.S. Cl. .......................................... 358/32; 358/31; 358/29
[58] Field of Search ................... 358/32, 29 C, 29, 31, 358/41

[56] References Cited

U.S. PATENT DOCUMENTS

| | | | |
|---|---|---|---|
| 4,700,219 | 10/1987 | Tamika et al. | 358/29 C |
| 4,992,854 | 2/1991 | Aso et al. | 358/29 C |
| 4,998,162 | 3/1991 | Kondo et al. | 358/41 |
| 5,103,298 | 4/1992 | Kashimura et al. | 358/32 |

FOREIGN PATENT DOCUMENTS

| | | |
|---|---|---|
| 0394018 | 10/1990 | European Pat. Off. . |
| 54-48446 | 11/1980 | Japan . |
| 57-12813 | 8/1983 | Japan . |
| 0234690 | 9/1988 | Japan . |
| 63-31290 | 8/1989 | Japan . |

*Primary Examiner*—Victor R. Kostak
*Assistant Examiner*—Jeffrey S. Murrell
*Attorney, Agent, or Firm*—Antonelli, Terry, Stout & Kraus

[57] ABSTRACT

A detection circuit for detecting a color temperature of the ambient light of an object is provided in a video camera. A γ-correction circuit for subjecting a luminance signal Y obtained by processing an output signal of a solid-state imaging device to γ-correction with a fixed gamma coefficient changes the correction level of the luminance signal Y in accordance with the fluctuation of the color temperature detected by the detection circuit. As a result, it is prevented that in a low color temperature, a red portion of a reproduced image becomes abnormally bright. Further, there is provided an illuminance detection circuit. In a low illuminance, the correction level of the γ-correction circuit is reduced to prevent mixture of the noise.

9 Claims, 9 Drawing Sheets

VIDEO CAMERA HAVING A γ-CORRECTION CIRCUIT FOR CORRECTING LEVEL CHARACTERISTICS OF A LUMINANCE SIGNAL INCLUDED IN A VIDEO SIGNAL

BACKGROUND OF THE INVENTION

The present invention relates to a video camera having a γ-correction circuit for correcting level characteristics of a luminance signal included in a video signal.

A picture tube of a television receiver has input/output characteristics of non-linearity called a gamma. Therefore, the video camera is designed in such a way that a γ-correction circuit having reverse characteristics with respect to the picture tube is provided and the γ-correction of a video signal is performed by the γ-correction circuit to send the resultant signal to the television receiver thereby to cancel the γ-characteristics of the picture tube. As a result, a pictorial image equal to an input image of an image pick-up device of the video camera is displayed on the television receiver.

As a γ-correction circuit, hitherto, there are proposed those of various types.

For example, in JP-A-58-130676, there is disclosed a γ-correction circuit which is designed in such a way that a video signal which was subjected to γ-correction and a video signal which was not subjected to the γ-correction are added to each other and there sultant addition ratio is made to be variable thereby to obtain a video signal which was subjected to the γ-correction with a desired gamma value.

Moreover, in JP-A-55-140372, there is disclosed a technique which is arranged in such a way that two luminance signals which were subjected to the γ-correction with different gamma values are mixed with each other and the resultant mixture ratio is changed in accordance with a signal distribution state of the luminance signals.

Further, in JP-A-1-206775, there is disclosed a technique which is arranged in such a way that a low-frequency component of a luminance signal is subjected to γ-correction with a fixed gamma value, a high-frequency component thereof subjected to the γ-correction with a gamma value which is changed in accordance with the level of the luminance signal, and the low-frequency and high-frequency components which were subjected to the γ-correction are added to each other thereby to prevent the degradation of an S/N ratio so as not to amplify the noise contained in the high-frequency component of the luminance signal whose level is low.

SUMMARY OF THE INVENTION

Generally, in the video camera used in household or the like, there is used a solid-state imaging device provided with a color filter array in which a plurality kind of color filters are arranged for each picture element on a light receiving surface, and a color signal for each kind of color filter which is obtained from the solid-state imaging device is processed in a matrix circuit thereby to produce original color signals of R, G and B.

Now, with such a solid-state imaging device, there is provided such a structure that a photosensitive portion is arranged on a silicon substrate. Therefore, the spectral sensitivity is largely influenced by the light wavelength dependency of quantum efficiency of silicon, so that it is generally low to a blue light and is high to lights from a green light to a red light. In other words, in the video camera employing the solid-state imaging device, the spectral sensitivity is changed by a color temperature of the ambient light of the object so that the quantity of signal is increased as the color temperature becomes low.

With respect to the color signal out of the video signals, since the correction is generally carried out on the basis of a white balance, the difference with the above spectral sensitivity does not become a problem so much. With respect to the luminance signal, however, hitherto, there is no consideration about the color temperature. As a result, especially, the saturation of the R (red) signal at a low color temperature is lowered. Thus, even if the image is processed so as to be faithfully reproduced and displayed as described above by the γ-correction, the red color portion of the reproduced image will be abnormally, brightly displayed. As a result, an unnatural reproduced image will be obtained.

The advantage of the present invention is that a good reproduced image is obtained regardless of an color temperature of the ambient light of an object when taking a picture.

The further advantage of the present invention is that in a video camera, the correction level of a luminance signal by a γ-correction circuit can be changed.

The even further advantage of the present invention is that even when the illuminance of the surroundings of an object when taking a picture is low, it is possible to prevent a γ-correction circuit from being mixed with the noise.

A video camera according to the present invention includes therein a detection circuit for detecting a color temperature of the ambient light of an object, so that a γ-correction circuit serves to change the level used for correcting a luminance signal in accordance with the fluctuation of the color temperature detected by the detection circuit.

In a low color temperature, the luminance signal is subjected to the γ-correction in a slightly suppressive manner as compared with the normal case, so that the level thereof is further suppressed as compared with the case where the normal γ-correction is performed. As a result, such an unnatural display is eliminated that in a picture tube of a television receiver, the luminance level of the red portion of the reproduced image in the low color temperature is suppressed, and that portion is displayed with being embossed.

DESCRIPTION OF PREFERRED EMBODIMENTS

Preferred embodiments of the present invention will hereinafter be described in detail with reference to the accompanying drawings.

Figure 1:
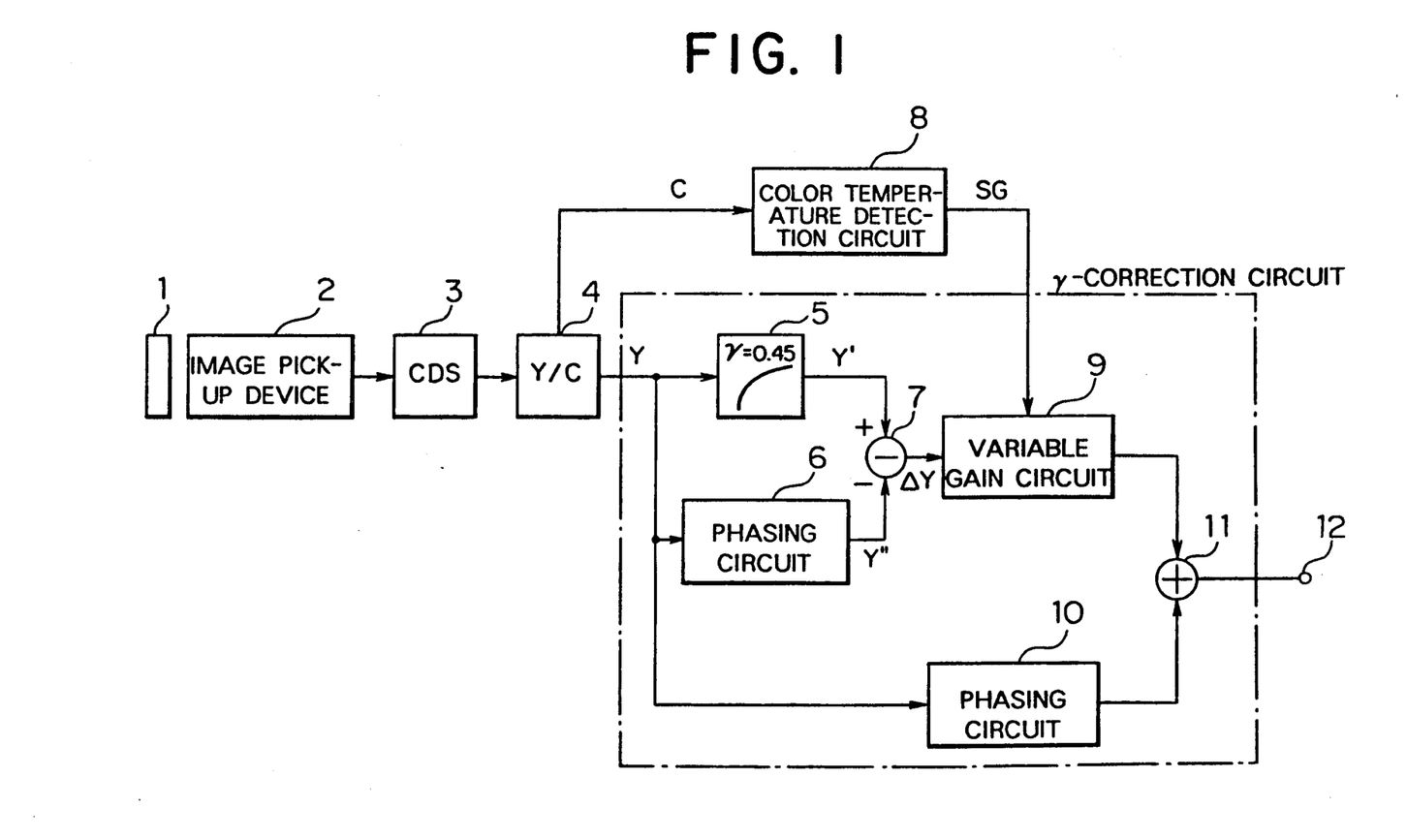
FIG. 1 is a block diagram showing the arrangement of a video camera having a γ-correction circuit according to one embodiment of the present invention.

FIG. 1 is a block diagram showing the arrangement of a video camera having a γ-correction circuit according to one embodiment of the present invention. In this figure, reference numeral 1 designates an infrared cut filter; reference numeral 2 designates a solid-state imaging device; reference numeral 3 designates a Correlated Double Sampling (CDS) circuit; reference numeral 4 designates a Y/C division circuit; reference numeral 5 a fixed γ-correction circuit; reference numeral 6 a phasing circuit; reference numeral 7 a subtracter; reference numeral 8 a color temperature detection circuit; reference numeral 9 variable gain circuit; reference numeral 10 a phasing circuit; reference numeral 11 an adder; and reference numeral 12 an output terminal.

In the figure, an image of an object is formed on the solid-state imaging device 2 by the ambient light in which the infrared ray region components are removed by the infrared cut filter 1. The solid-state imaging device 2 serves to photoelectrically transfer the image of the object to output a video signal. This video signal is divided into a luminance signal Y and a color signal C in the Y/C division circuit after the noise is reduced by the CDS circuit 3. The luminance signal Y is applied to both the fixed γ-correction circuit 5 and the phasing circuits 6, 10 while the color signal C is applied to the color temperature detection circuit 8.

Figure 2:
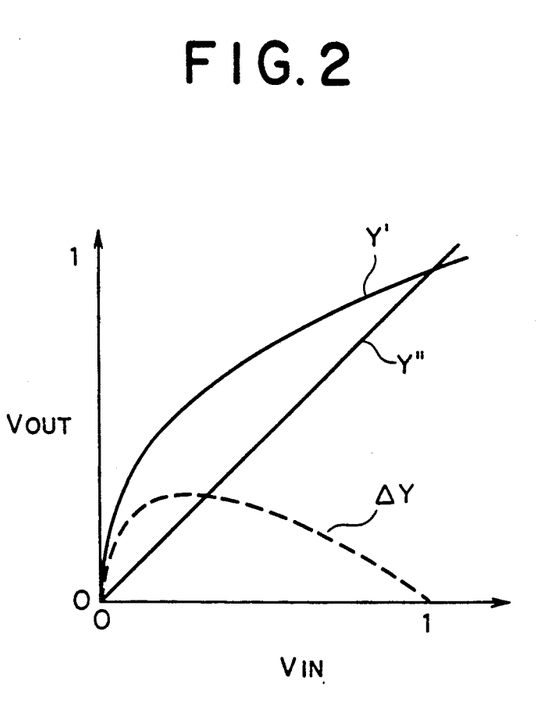
FIG. 2 is a graphical representation showing output characteristics of a fixed γ-correction circuit 5, a phasing circuit 6 and a subtracter 7 shown in FIG. 1.

The fixed γ-correction circuit 5 has the reverse gamma-characteristics (gamma coefficient=0.45) of the gamma-characteristics (gamma coefficient=2.2) of a picture tube in a television receiver and processes the luminance signal Y to output a luminance signal Y' having the characteristics shown by a curve Y' in FIG. 2. Moreover, the phasing circuit 6 has the delay quantity and the attenuation both being equal to those of the fixed γ-correction circuit 5 and the linear characteristics, and the gain thereof is 1. Therefore, a luminance signal Y" which is equal to the luminance signal Y and corresponds in phase to the output luminance signal Y' of the fixed γ-correction circuit 5 is outputted from the phasing circuit 6. The characteristic of the luminance signal Y" is shown in FIG. 2 in the form of a solid line Y".

In the subtracter 7, the luminance signal Y" is subtracted from the luminance signal Y' to produce a difference signal ΔY having the characteristic shown by a broken line ΔY in FIG. 2. Now, let us assume that the luminance signal Y is represented by Vin, the luminance signals Y', Y" and the difference signal ΔY are represented by $V_1$, $V_2$, and $V_3$, respectively, and the gamma coefficients of the fixed γ-correction circuit 5 and the phasing circuit 6 are represented by $\gamma_1$ (=0.45) and $\gamma_2$ (=1), respectively. Then, the following relationships are established.

$$V_1 = V_{in}^{\gamma_1}, V_2 = V_{in}^{\gamma_2}, V_3 = V_{in}^{\gamma_1}, -V_{in}^{\gamma_2},$$

The difference signal Y from the subtracter 7 is amplified in the variable gain circuit 9 and is then added to the luminance signal Y in the adder 11 which is delayed in the phasing circuit 10, thereby to be outputted from the output terminal 12. The gain of the variable gain circuit 9 is controlled by the gain control signal SG from the color temperature detection circuit 8. The gain is controlled in such a way as to be less than 1 in the low color temperature and to be equal to 1 in an arbitrary color temperature other than the low color temperature. The gain control signal SG is produced from the color signal C by the color temperature detection circuit 8. The phasing circuit 1 has the delay quantity and the attenuation which are respectively equal to the total delay quantities and the total attenuation of the phasing circuit 6, the subtracter 7 and the variable gain circuit 9, and has the liner characteristic (gamma coefficient=1). Therefore, the output signal of the variable gain circuit 9 corresponds in phase to that of the phasing circuit 10.

As a result, the luminance signal produced at the output terminal 12 is subjected to the predetermined γ-correction in an arbitrary color temperatures other than the low color temperature so as to be equal to the luminance signal outputted from the fixed γ-correction circuit 5, while in the low color temperature, the gain of the variable gain circuit 9 is less than 1 thereby to attenuate the difference signal ΔY. Therefore, the level of the luminance signal is suppressed and corrected in the red region.

Figure 3:
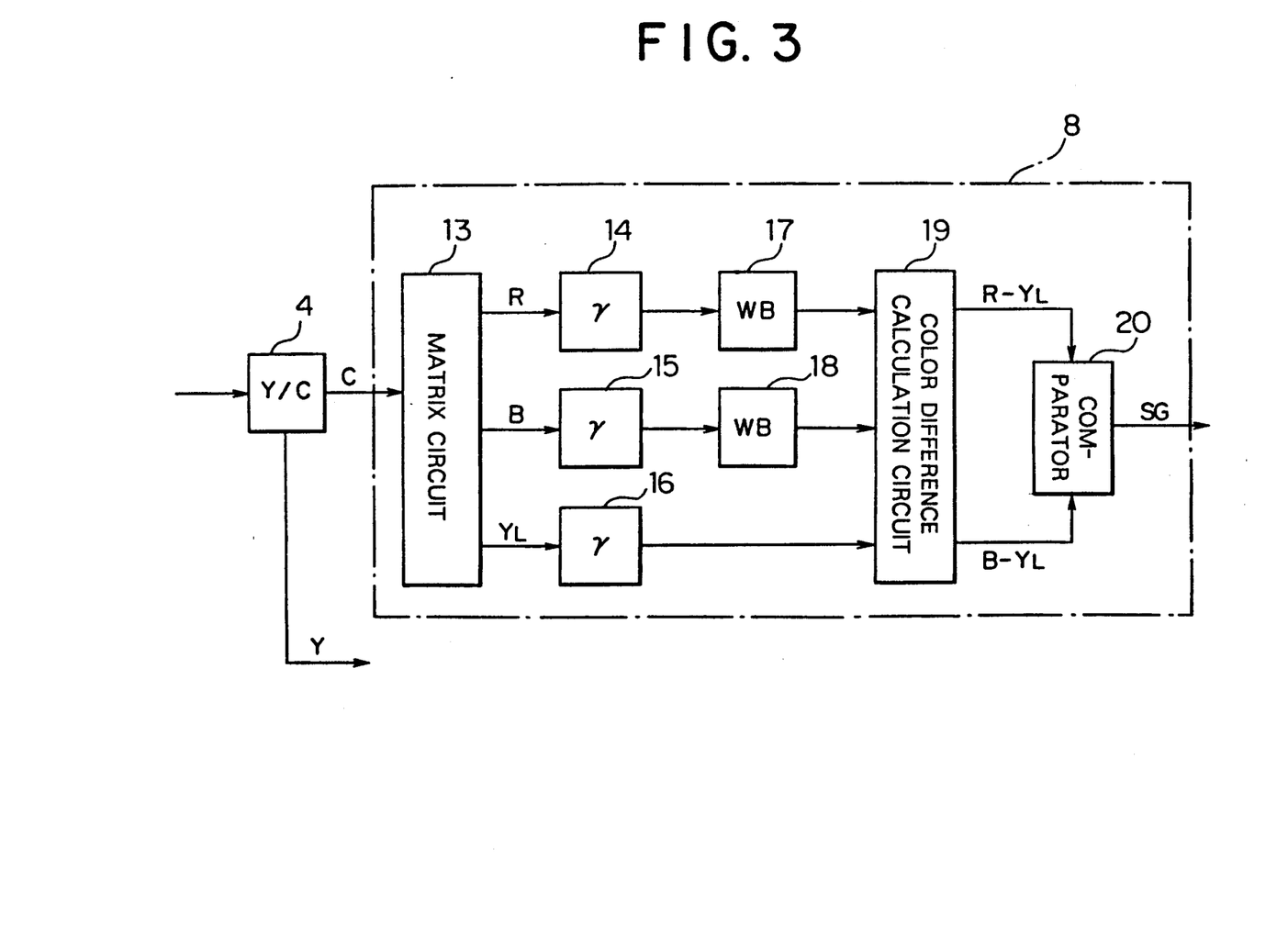
FIG. 3 is a block diagram showing an example of the arrangement of a color temperature detection circuit 8 shown in FIG. 1.

FIG. 3 is a block diagram showing the arrangement of one concrete example of the color temperature detection circuit 8 shown in FIG. 1. In this figure, reference numeral 13 designates a matrix circuit; reference numerals 14 through 16 designate γ-circuits; reference numerals 17 and 18 white balance circuits; reference numeral 19 a color difference calculation circuit; and 20 reference numeral a comparator. Those elements in correspondence to their counter elements in FIG. 1 are represented with the same reference numerals.

In FIG. 3, the color signal C with a narrow band width outputted from the Y/C division circuit 4 is applied to the matrix circuit 13 in which a R (red) signal and a B (blue) signal corresponding to original colors, are produced and a luminance signal $Y_L$ with a narrow band width which is substantially equal to the frequency 6 and width of the R and B signals is also produced. The R and B signals, and the luminance signal $Y_L$ are subjected to the γ-correction in the γ-correction circuits 14, 15 and 16, respectively, to make up the linearity. Further, the R and B signals are subjected to the amplitude adjustment in the white balance circuits 17 and 18, respectively, to be applied to the color difference calculation circuit 19. The color difference calculation circuit 19 processes the R and B signals, and the luminance signal $Y_L$ to produce two color difference signals $R - Y_L$ and $B - Y_L$.

The above processing is the same as that of the color difference processing circuit in the prior art video camera. Thus, the $R - Y_L$ and $B - Y_L$ signals thus produced are supplied to an adder (not shown) for producing a color video signal.

Moreover, the $R - Y_L$ and $B - Y_L$ signals outputted from the color difference calculation circuit 19 are also supplied to the comparator 20. The comparator 20 compares the amplitude of $R-Y_L$ signal with that of $B-Y_L$ signal. Then, when the relationship of $R-Y_L > B-Y_L$ is established and the difference therebetween is more than a predetermined value, it is judged that the ambient light of the object is the low color temperature, thereby to produce the gain control signal SG. By the gain control signal SG, the gain of the variable gain circuit 9 (shown in FIG. 1) is made to be less than 1.

As described above, in the present embodiment, normally, the luminance signal produced at the output terminal 12 of FIG. 1 is subjected to the $\gamma$-correction in the fixed $\gamma$-correction circuit 5. However, in the low color temperature, the luminance signal is subjected to the $\gamma$-correction in a slightly suppressive manner. Therefore, in the reproduced picture, such unnaturalness is eliminated that the portion at the low color temperature becomes abnormally bright.

Figure 4:
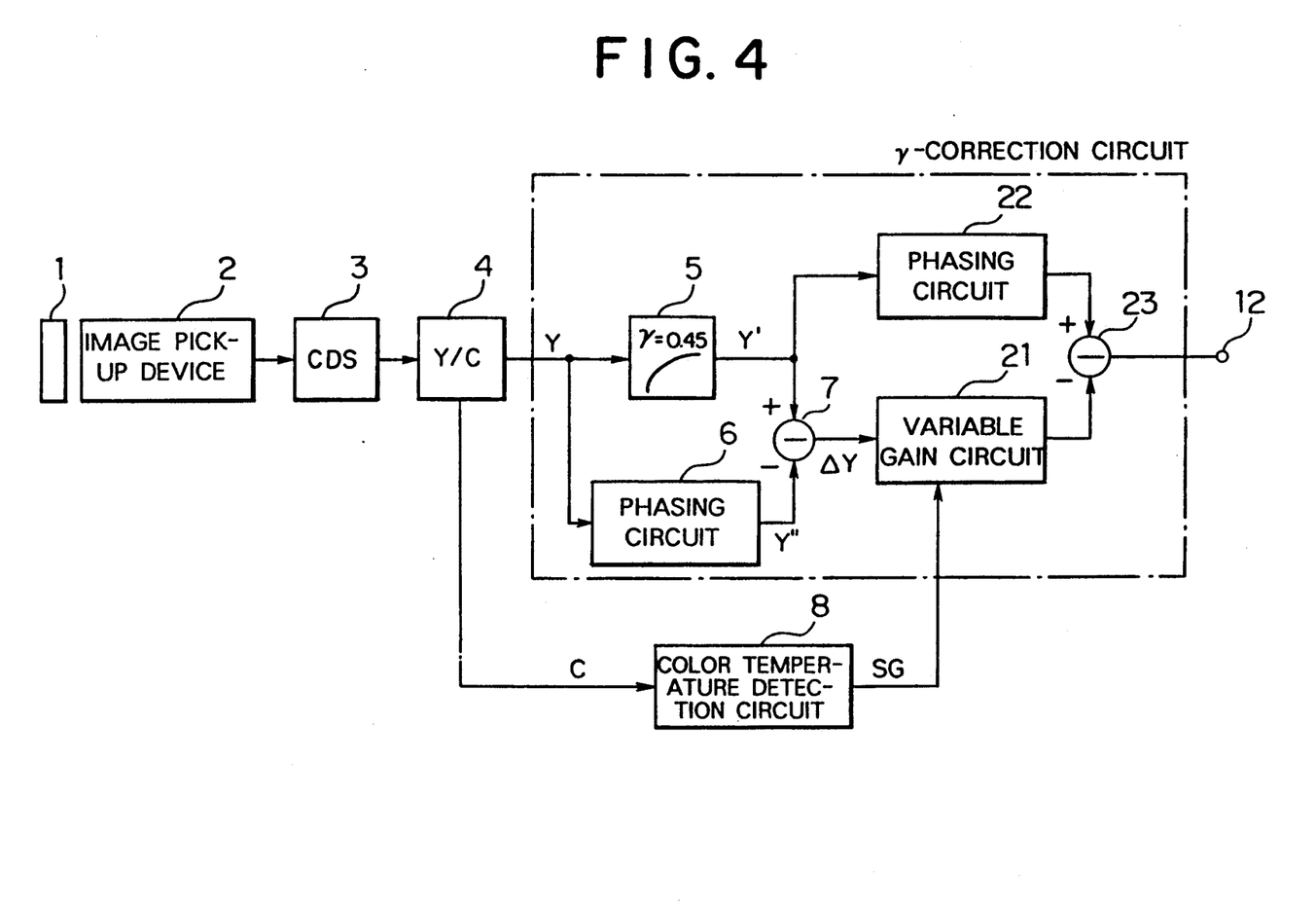
FIG. 4 is a block diagram showing the arrangement of a video camera having a γ-correction circuit according to a further embodiment of the present invention.

FIG. 4 is a block diagram showing the arrangement of a video camera having a $\gamma$-correction circuit according to a further embodiment of the present invention. In the figure, reference numeral 21 designates a variable gain circuit, reference numeral 22 designates a phasing circuit, and reference numeral 23 designates a subtracter. Those elements in correspondence with their counter elements in FIG. 1 are represented with the same reference numerals.

In FIG. 4, the difference signal $\Delta Y$ obtained in the subtracter 7 is applied to the variable gain circuit 21. In the variable gain circuit 21, the gain G is controlled by the gain control signal SG from the color temperature detection circuit 8 so that the relationship of $G=0$ is established. In the low color temperature, however, the gain G is set to a predetermined value in the range of $0 < G < 1$. Therefore, although normally, any signal is not outputted from the variable gain circuit 21, in the low color temperature, the difference signal $\Delta Y$ is outputted from the variable gain circuit 21 while being attenuated.

On the other hand, after the luminance signal Y' outputted from the fixed $\gamma$-correction circuit 5 is made to coincide in phase with the output signal of the variable gain circuit 21 by the phasing circuit 22, it is applied to the subtracter 23 to subtract the output of the variable gain circuit 21 from that of the phasing circuit 22 to produce an output signal.

Thus, although normally, the luminance signal produced at the output terminal 12 is subjected to the $\gamma$-correction in the fixed $\gamma$-correction circuit 5, in the low color temperature, the $\gamma$-correction is suppressed by the magnitude of the signal outputted from the variable gain circuit 21. Therefore, in the present embodiment as well, there is produced the same effects as those of the embodiment shown in FIG. 1.

Figure 5:
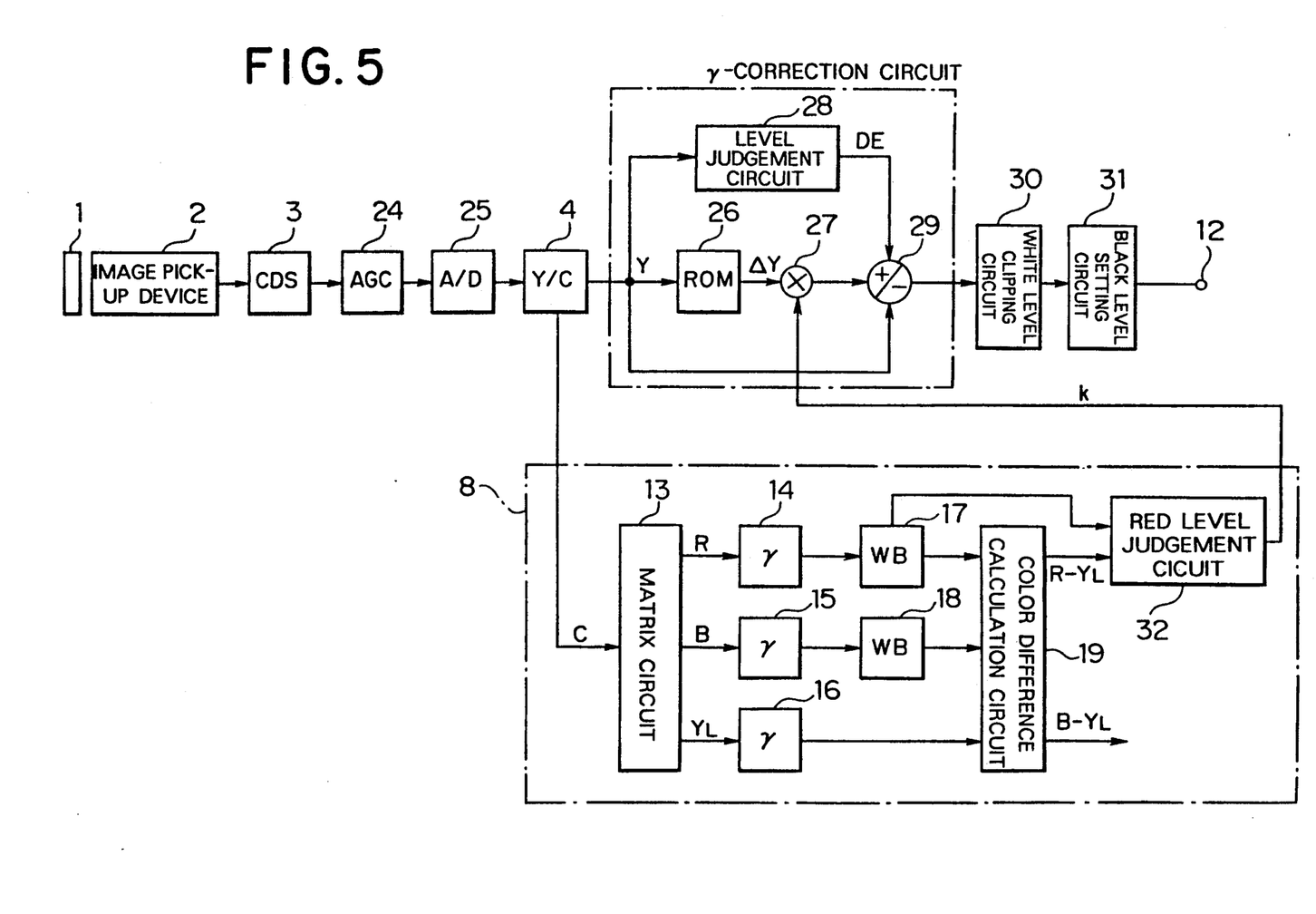
FIG. 5 is a block diagram showing the arrangement of a video camera having a γ-correction circuit according to an even further embodiment of the present invention.

FIG. 5 is a block diagram showing the arrangement of a video camera having a $\gamma$-correction circuit according to an even further embodiment. In the figure, reference numeral 24 designates an automatic gain control (AGC) circuit; reference numeral 25 designates an A/D converter; reference numeral 26 designates a read only memory (ROM); reference numeral 27 a multiplication circuit; reference numeral 28 a level judgement circuit; reference numeral 29 an addition/subtraction circuit; reference numeral 30 a black level setting circuit; reference numeral 31 a white clipping circuit; and reference numeral 32 a red level judgement circuit. Those elements in correspondence to their counter elements in FIG. 1 and FIG. 3 are represented with the same reference numerals.

In FIG. 5, the output signal of the CDS circuit 3 is made to be proper with the amplitude thereof and is then converted into a digital signal in the A/D converter 25. The subsequent processings are performed in a digital manner. Therefore, the Y/C division circuit 4 and the color temperature detection circuit 8 which are represented with the same reference numerals as those of FIG. 1 and FIG. 3 perform the respective digital processings. But, for brevity, the elements other than the necessary elements will be described with the expression of the analog processing.

The output signal of the A/D converter 25 is applied to the Y/C division circuit 4 to be divided into the luminance signal Y and the color signal C. The luminance signal Y is applied to the ROM 26, the level judgement circuit 28 and the addition/subtraction circuit 29, while the color signal C is applied to the color temperature detection circuit 8.

Figure 6:
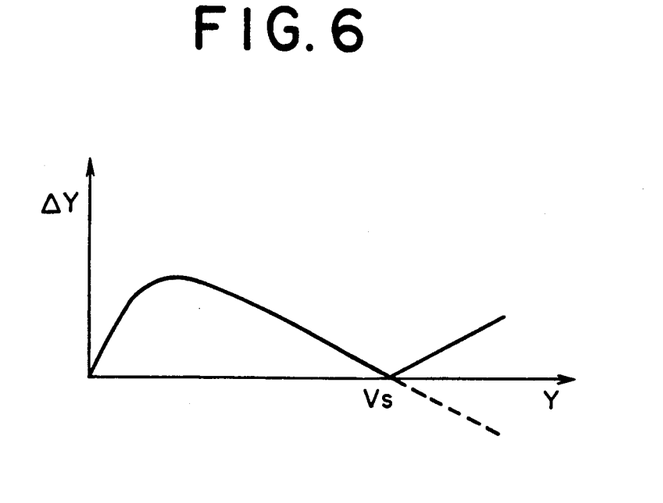
FIG. 6 is a graphical representation showing a difference value data ΔY stored in the inside of a ROM 26 shown in FIG. 5.

In the ROM 26 are stored the data representing a difference between the luminance signals (Y' and Y" in FIG. 1 and FIG. 2) which correspond to each level of the luminance signal Y and are obtained when the luminance signal Y is subjected to the $\gamma$-correction with $Y=0.45$, and the luminance signal Y (hereinafter, referred to as "the differential value data", when applicable). The differential value data for each level of the luminance signal Y correspond to $\Delta Y$ represented by the broken line in FIG. 2 and are shown in FIG. 6. But, when the differential value data $\Delta Y$ exceed the level Vs (corresponding to $Vin=1$ in FIG. 2) of the luminance signal Y, $\Delta Y$ actually takes the negative values as shown by the broken line. The present embodiment is, however, arranged in such a way that the number of bits of the differential value data is not increased so as not to add 1 bit representing the negative value to the differential value data $\Delta Y$. Therefore, the differential value data exceeding the level Vs of the luminance signal Y are also stored in the ROM 26 in the form of the positive values, as shown by a solid line in FIG. 6.

After the sample data of the luminance signal Y is supplied from the Y/C division circuit 4, the differential value data $\Delta Y$ corresponding to the value (level) of that sample data are read out from the ROM 26 to be supplied to the multiplication circuit 27 which multiplies $\Delta Y$ by a coefficient k from the color temperature detection circuit 8. Now, while the coefficient k is normally equal to 1, in the low color temperature, it takes a predetermined value in the range of $0 < k < 1$. Therefore, normally, the differential value data $\Delta Y$ read out from the ROM 26 are directly applied to the addition/subtraction circuit 29 via the multiplication circuit 27. In the low color temperature, however, $\Delta Y$ is multiplied by k less than 1 to be decreased to be applied to the addition/subtraction circuit 29.

On the other hand, the level judgement circuit 28 judges the value for each sample data of the luminance signal Y to output a judgement signal DE representing whether or not that value is more than the value Ns corresponding to the level Vs (shown in FIG. 6). The level Vs is set to the standard white level (100IRE) for example. On the basis of the judgement signal DE, the addition/subtraction circuit 29 acts as an addition circuit to add the differential value data from the multiplication circuit 27 to the luminance signal Y when the value of the sample data is less than Ns (i.e., when the value of the sample data is less than Ns), while it acts as a subtraction circuit to subtract the differential value data from the multiplication circuit 27 from the luminance signal Y when the level of the luminance signal Y is more than Vs. As a result, a luminance signal which is obtained by adding the differential value data ΔY, the level of which is more than the level Vs in FIG. 6 and which takes the negative values (represented by the broken line), to the luminance signal Y is outputted from the addition/subtraction circuit 29.

Figure 7:
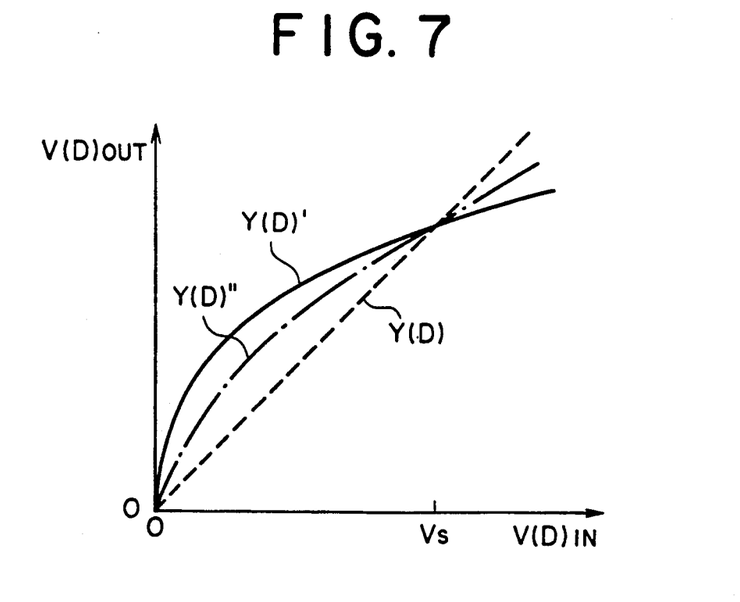
FIG. 7 is a graphical representation showing output characteristics of an addition/subtraction circuit 29 shown in FIG. 5.

If it is assumed that the level of the luminance signal Y is $V(D)_{in}$, and the level of the output luminance signal of the addition/subtraction circuit 29 is $V(D)_{out}$, the relationship between V(D)in and $V(D)_{out}$ is established as shown in FIG. 7. But, a broken line Y(D) represents the level $V(D)_{out}$ in the case where the luminance signal Y is directly outputted from the addition/subtraction circuit 29. Moreover, a solid line Y(D)' represents the level $V(D)_{out}$ of the output luminance signal of the addition/subtraction circuit 29 in the case of k=1, and the dashed line Y(D)" represents the level $V(D)°$ ut of the output luminance signal of the addition/subtraction circuit 29 in the case of k<1.

Then, the ROM 26 corresponds to the section made up of the fixed γ-correction circuit 5, the phasing circuit 6 and the subtracter 7 shown in FIG. 1, the multiplication circuit 27 corresponds to the variable gain circuit 9 in FIG. 1, and the addition/subtraction circuit 29 corresponds to the adder 11 in FIG. 1.

The black level of the output luminance signal of the addition/subtraction circuit 29 is set in the black level setting circuit 30 and the white level thereof is set in the white clipping circuit 31 so that the output luminance signal is outputted from the output terminal 12.

The color temperature detection circuit 8 produces two color difference signals $R-Y_L$ and $B-Y_L$ from the output color signal C of the Y/C division circuit 4 in the same manner as in the color temperature detection circuit 8 shown in FIG. 2. In addition, the red level judgement circuit 32 judges whether or not it is the low color temperature on the basis of the level of the $R-Y_L$ signal or the variable quantity of the R signal in the white balance circuit 17 and produces the above coefficient k in accordance with that judgement result to output the coefficient k therefrom.

As described above, in the present embodiment as well, there is provided the same effects as those of the embodiment shown in FIG. 1.

Figure 8:
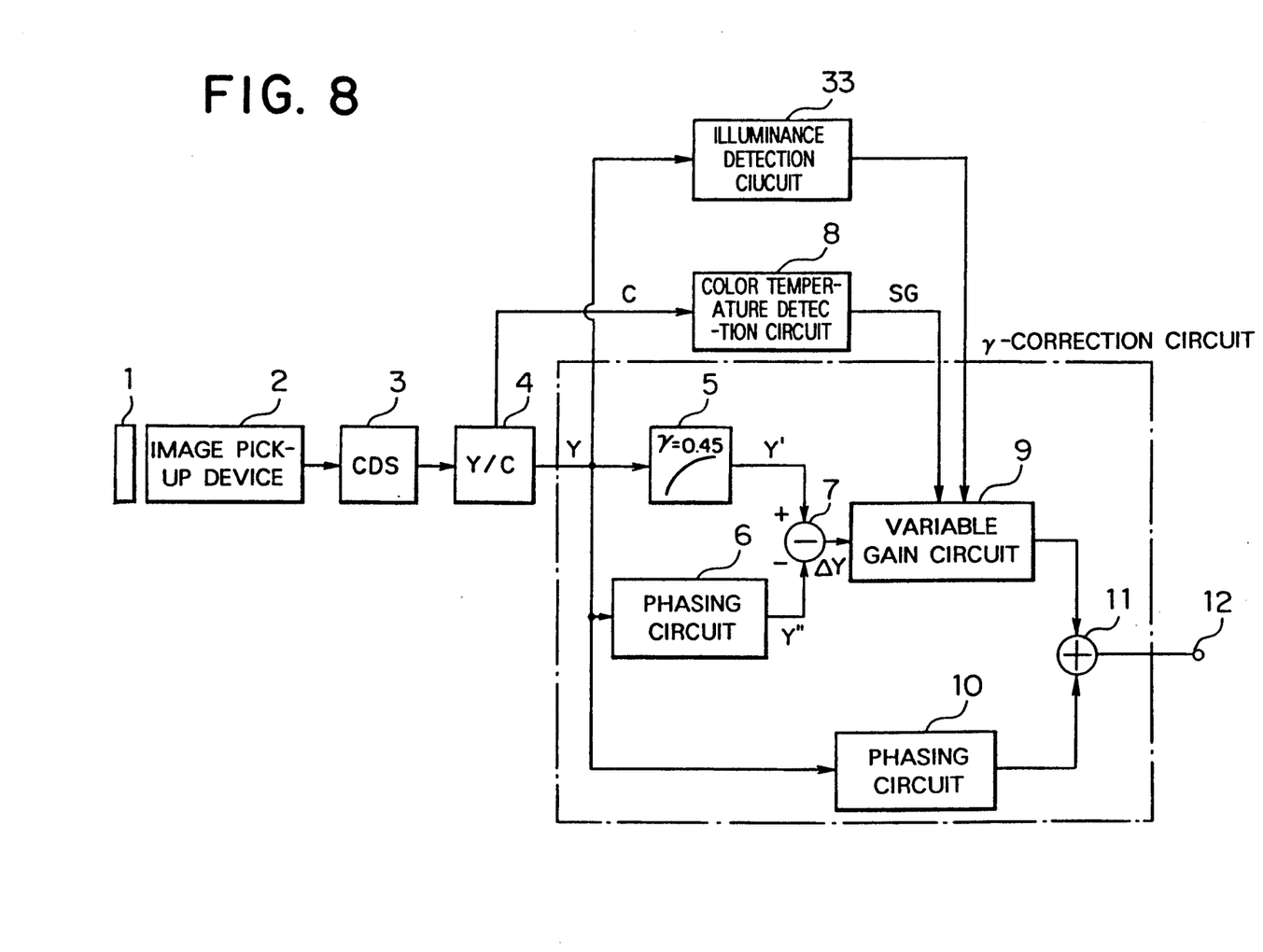
FIG. 8, FIG. 9 and FIG. 10 are respective block diagrams showing the arrangements of video cameras each having a γ-correction circuit according to other embodiments of the present invention

FIG. 8 is a block diagram showing the arrangement of a video camera having a γ-correction circuit according to another embodiment of the present invention. In the figure, reference numeral 33 designates an illuminance detection circuit. Those elements in correspondence to their counter elements in FIG. 1 are represented with the same reference numerals.

The present embodiment is, as shown in FIG. 8, arranged in such a way that the illuminance detection circuit 33 for obtaining the average level of the luminance signal outputted from the Y/C division circuit 4 to detect the illuminance of the surroundings of the object on the basis of that average level is additionally provided in the embodiment shown in FIG. 1, and the variable gain circuit 9 is further controlled in accordance with the detection result.

In the case of low illuminance, since the level of the luminance signal Y is low, the level of the noise cannot be neglected as compared with the level of the luminance signal. Therefore, if such a luminance signal is subjected to the normal γ-correction, the noise will be remarkably conspicuous on the reproduced picture, so that the picture quality will be remarkably degraded.

Then, in FIG. 8, the illuminance detection circuit 33 is provided. As a result, when the circuit 33 detects that the surroundings of the object is in the low illuminance state, the variable gain circuit 9 sets the gain to a certain level less than 1 using the output signal of the illuminance detection circuit 33, irrespective of the gain control signal SG from the color temperature detection circuit 8. As a result, the difference signal ΔY outputted from the subtracter 7 is applied to the adder 11 while the level thereof being suppressed. At the same time, the luminance signal, which is produced at the output terminal 12, has the level which is largely suppressed as compared with the luminance signal Y' subjected to the γ-correction in the fixed γ-correction circuit 5.

In the low illuminance, the noise component with a large level is also included in the difference signal ΔY. However, when the level of the difference signal ΔY is, as described above, suppressed by the variable gain circuit 9, the level of the noise component is also suppressed to be small. Therefore, although the luminance signal produced at the output terminal 12 is also mixed with the noise component, the level of the noise component becomes smaller than the level thereof when the gain of the variable gain circuit 9 is not less than 1. As a result, the noise does not influence upon the picture quality of the reproduced picture. Thus, the degradation of the picture quality in the low illuminance can be effectively prevented.

Incidentally, since the level of the luminance signal is small in the low illuminance, the brightness of the reproduced picture is not changed remarkably even if the color temperature is changed. Therefore, even if the gain control of the variable gain circuit 9 by the color temperature detection circuit 8 is stopped in the low illuminance, this does not become a problem particularly.

Figure 9:
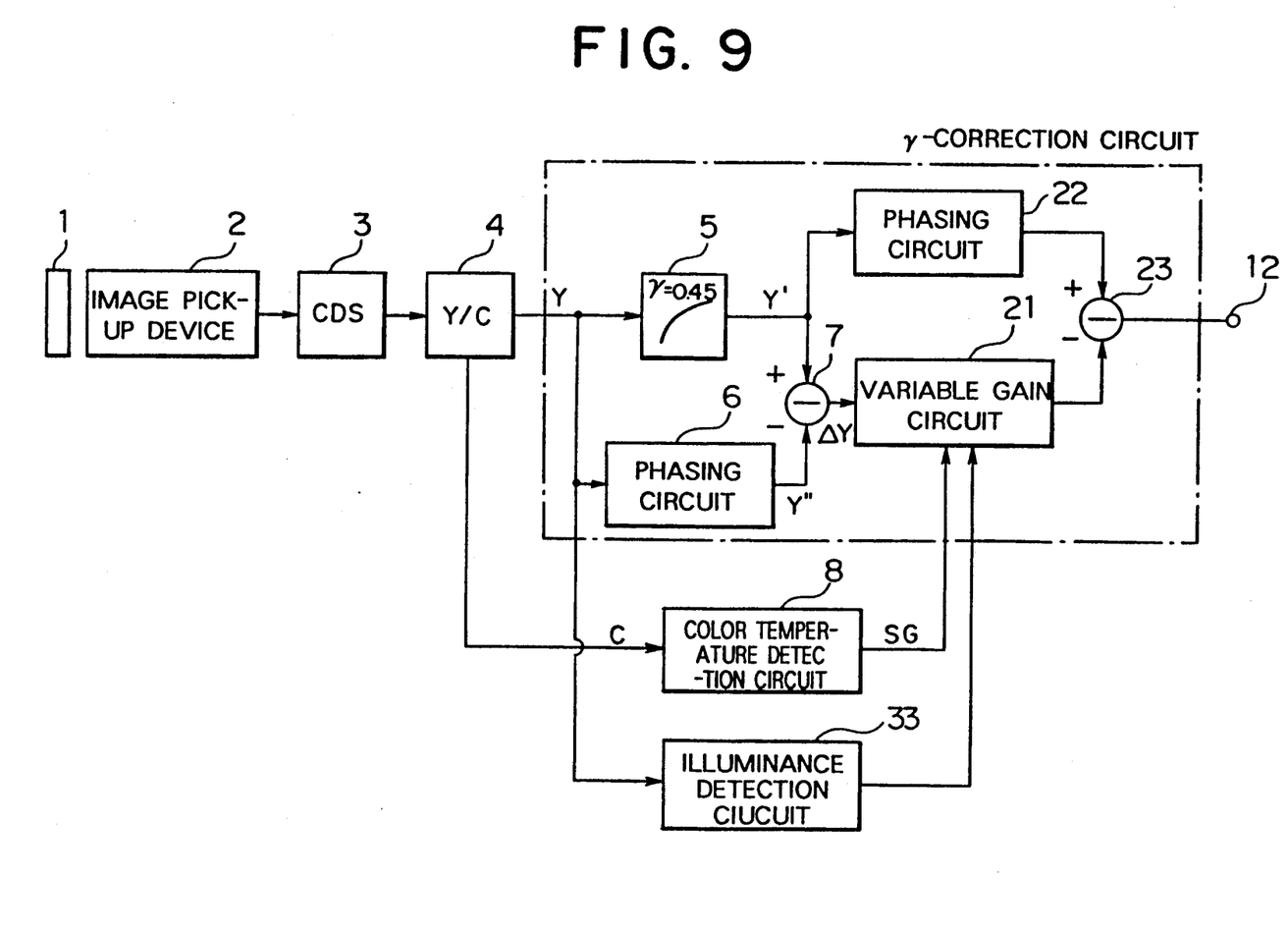

With respect to the embodiment shown in FIG. 4, there arises the same problem. As shown in FIG. 9, however, the illuminance detection circuit 33 for detecting the illuminance from the luminance signal Y is provided, and the gain of the variable gain circuit 21 is always made to be more than zero in the low illuminance, whereby in the low illuminance, a luminance signal provided at the output terminal 12 is always suppressed in terms of the level thereof, as compared with the luminance signal Y which was subjected to the γ-correction in the fixed γ-circuit 5. Thus, there is provided the same effects as in the embodiment shown in FIG. 8.

Figure 10:
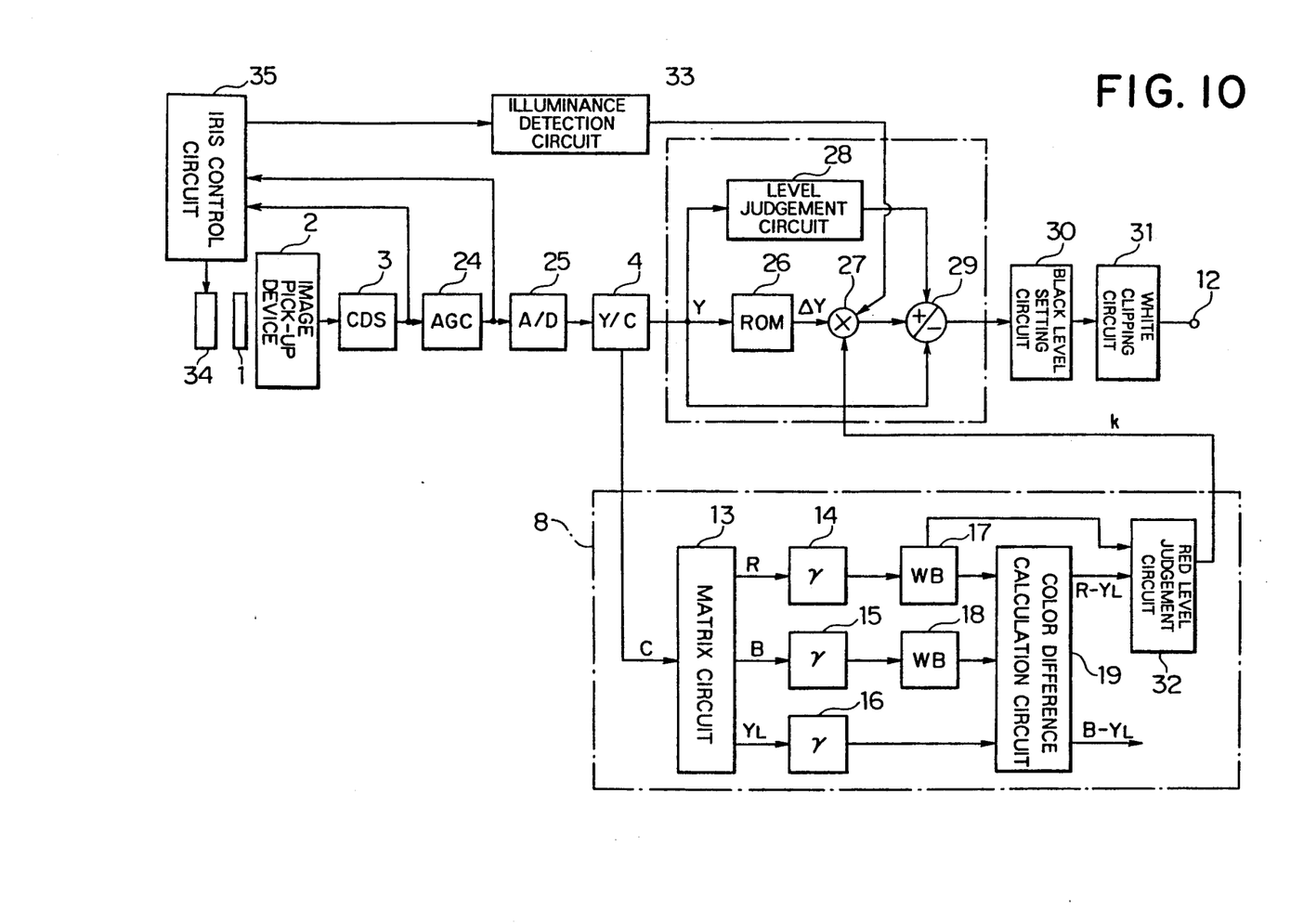

Further, with respect to the embodiment shown in FIG. 5 as well, there arises the same problem. Therefore, with that embodiment as well, as shown in FIG. 10, the illuminance detection circuit 33 is provided, and in the low illuminance, the coefficient k of the multiplication circuit 27 is set to a value less than 1 by the output of the illuminance circuit 33, whereby a luminance signal produced at the output terminal 12 can be always suppressed in terms of the level thereof, as compared with the luminance signal Y which was subjected to the γ-correction with Y=0.45. As a result, there is provided the same effects in the embodiment shown in FIG. 8.

Incidentally, in FIG. 10, if the illuminance detection circuit 33 is such a circuit as to have a function of performing the digital processing, it can detect the illuminance from the luminance signal Y which is outputted from the Y/C division circuit 4. However, in the case where the illuminance detection circuit 33 is such a circuit as to perform the analog processing, as shown in FIG. 10 for example, the circuitry can be arranged in such a way that on the basis of the processed signal of an iris circuit 35 for performing the control of an iris 34 using output signals of a CDS circuit 3 and an AGC circuit 24, the illuminance is detected.

Moreover, in the embodiments shown in FIG. 1 and FIG. 8, the circuitry may be arranged in such a way that the subtracter 7 serves to subtract the luminance signal Y' from the luminance signal Y''. However, in this arrangement, a subtracter is employed instead of the adder 11. In the embodiments shown in FIG. 4 and FIG. 9, an adder is employed instead of the subtracter 23.

As set forth hereinabove, according to the present invention, it is possible to prevent the undesired luminance increasing in the low color temperature portion in the reproduced picture which is caused by subjecting the resultant luminance signal to the γ-correction. Thus, it is possible to always display a natural picture.

Moreover, according to the present invention, in the low illuminance, the level of the noise can be suppressed so that the noise cannot influence upon the picture quality of the reproduced picture remarkably.

We claim:

1. A video camera comprising:
   a solid-state imaging device for subjecting an image of an object to photoelectric transfer to output a video signal;
   Y/C division circuit for dividing the video signal into a luminance signal Y and a color signal C;
   a color temperature detection circuit for detecting a color temperature of the ambient light of the object image from the color signal C to produce a control signal in accordance with the detection result; and
   a γ-correction circuit for varying the level of the luminance signal Y in accordance with the control signal,
   said γ-correction circuit including therein:
   a fixed γ-correction circuit having reverse gamma characteristics of gamma characteristics of a picture tube of a television receiver, for correcting the level of the luminance signal Y;
   a subtracter for producing a difference signal corresponding to a difference between the luminance signal which is subjected to the γ-correction to be outputted from said fixed γ-correction circuit, and the original luminance signal;
   a variable gain circuit for varying the gain of the difference signal in accordance with the control signal from said color temperature detection circuit; and
   a calculation circuit for producing an output signal from the original luminance signal and the difference signal which is processed in said variable gain circuit.

2. A video camera according to claim 1, wherein with said variable gain circuit, in accordance with the control signal from said color temperature detection circuit, the gain thereof is more than 0 and less than 1 in a low color temperature which is not higher than a predetermined color temperature, and the gain thereof is equal to 1 in an arbitrary color temperature other than the low color temperature, and said calculation circuit adds the difference signal which is processed in said variable gain circuit and the original luminance signal to each other.

3. A video camera according to claim 1, wherein with said variable gain circuit, in accordance with the control signal from said color temperature detection circuit, the gain thereof is more than 0 and less than 1 in a low color temperature which is not higher than a predetermined color temperature, and the gain thereof is equal to 1 in an arbitrary color temperature other than the low color temperature, and said calculation circuit subtracts the difference signal which is processed in said variable gain circuit from the luminance signal which is subjected to the γ-correction in said fixed γ-correction circuit.

4. A video camera according to claim 1, wherein said color temperature detection circuit includes therein:
   a matrix circuit for receiving the color signal C as the input thereof to produce a red signal R, a blue signal B and a luminance signal $Y_L$ with a narrow band width;
   a first γ-circuit for correcting the red signal R;
   a second γ-circuit for correcting the blue signal B;
   a third γ-circuit for correcting the luminance signal $Y_L$;
   a first white balance circuit for adjusting the amplitude of the red signal R which is corrected by said first γ-circuit;
   a second white balance circuit for adjusting the amplitude of the blue signal B which is corrected by said second γ-circuit;
   a color difference calculation circuit for producing a color difference signal $R-Y_L$ and a color difference signal $B-Y_L$ on the basis of the red signal R from said first white balance circuit, the blue signal B from said second white balance circuit and the luminance signal $Y_L$ from said third γ-circuit; and
   a comparator for comparing the amplitude of the color difference signal $R-Y_L$ and that of the color difference signal $B-Y_L$ with each other to produce a control signal in accordance with the comparison result.

5. A video camera according to claim 1, wherein an illuminance detection circuit for detecting illuminance of the surroundings of the object is provided, and in a low illuminance which is not higher than a predetermined luminance, the gain of said variable gain circuit is set so as to be different from that in the case of a low color temperature which is not higher than a predetermined color temperature by the control on the basis of the detection output of said illuminance detection circuit.

6. A video camera provided with a γ-correction circuit for subjecting an original luminance signal, which is obtained from an output signal of a solid-state imaging device, to γ-correction with a fixed gamma coefficient, said video camera comprising:
   color temperature detection means for detecting a color temperature of the ambient light of an object to judge whether or not the color temperature is a low color temperature which is not higher than a predetermined color temperature; and
   processing means for being controlled in accordance with the judgement result of said color temperature detection means in such a way that said processing means receives the luminance signal subjected to the γ-correction as the input thereof to directly output the γ-corrected luminance signal when the color temperature is an arbitrary color temperature other than the low color temperature, and processes the γ-corrected luminance signal so as to subject the γ-corrected luminance signal to a γ-correction with a gamma coefficient smaller than the gamma coefficient thereby to output the resultant signal when the color temperature is the low color temperature.

7. A video camera according to claim 6, wherein illuminance detection means for detecting illuminance of the surroundings of an object is provided, and in a low illuminance which is not higher than a predetermined illuminance, by the control on the basis of the detection output of said illuminance detection means, said processing means outputs a luminance signal which is suppressed with the level thereof as compared with the luminance signal subjected to the γ-correction in said γ-correction circuit.

8. A video camera for processing an output signal of a solid-state imaging device to produce an original digital luminance signal, said video camera comprising:
  a color temperature detection circuit for detecting a color temperature of the ambient light of an object to judge whether or not the detected color temperature is a low color temperature which is not higher than a predetermined color temperature;
  a memory for storing therein positive value data corresponding to a difference obtained by subtracting a level of the original digital luminance signal from a level thereof when the original digital luminance signal is subjected to γ-correction, corresponding to each level of the original digital luminance signal, and for reading out and outputting the positive value data corresponding to the level of the supplied original digital luminance signal;
  a multiplication circuit for multiplying the positive value data by a coefficient so that on the basis of the judgement of said color temperature detection circuit, the coefficient becomes more than 0 and less than 1 when the color temperature is the low color temperature, and the coefficient becomes equal to 1 when the color temperature is an arbitrary color temperature other than the low color temperature;
  a level judgement circuit for detecting a level of the original digital luminance signal to judge whether or not the level is more than a predetermined value; and
  an addition/subtraction circuit for being controlled in accordance with the judgement result of said level judgement circuit in such a way that the positive value data outputted from said multiplication circuit is added to the original digital luminance signal when the level of the original digital luminance signal is less then the predetermined value, and the positive value data outputted from said multiplication circuit is subtracted from the original digital luminance signal when the level of the original digital luminance signal is more than the predetermined value.

9. A video camera according to claim 8, wherein an illuminance detection circuit for detecting illuminance of the surroundings of the object is provided, and in a low illuminance which is not higher than a predetermined illuminance, by the control on the basis of the detection output of said illuminance detection circuit, the coefficient in said multiplication circuit is set to a value less than 1.

* * * * *